(No Model.)
F. McCLINTOCK.
DISSOLVING VIEW MAGIC LANTERN.
No. 450,815. Patented Apr. 21, 1891.
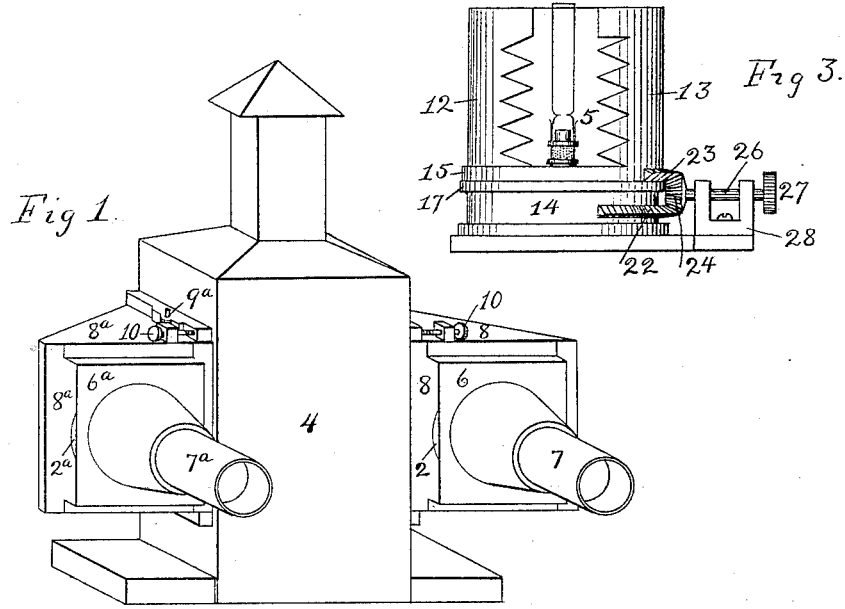
Fig 1.
Fig 3.
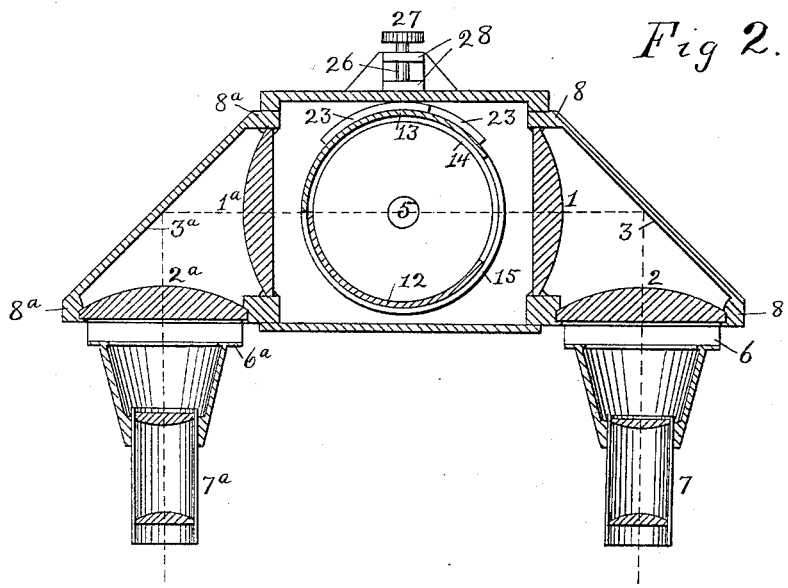
Fig 2.
WITNESSES:
Edwin Shaw
Fred W. Kalbaum
INVENTOR:
Frank McClintock

UNITED STATES PATENT OFFICE.

FRANK McCLINTOCK, OF GRAND JUNCTION, COLORADO.

DISSOLVING-VIEW MAGIC LANTERN.

SPECIFICATION forming part of Letters Patent No. 450,815, dated April 21, 1891.

Application filed June 16, 1890. Serial No. 355,578. (No model.)

*To all whom it may concern:*

Be it known that I, FRANK McCLINTOCK, a citizen of the United States, residing at Grand Junction, in the county of Mesa and State of Colorado, have invented a new and useful Improvement in Lanterns for Projection, of which the following is a specification.

My invention relates to "dissolving lanterns," so called; and the objects of my improvement are, first, to provide a single lantern body or case having only one lamp or other source of light, with two sets of condensing and objective lenses and mirrors so arranged that views may be projected on the same place on the screen by either set of lenses; second, to provide a suitable screen or shutter for producing the "dissolving" effect by shutting the light off from one set of lenses while it is being admitted to the other set, and, third, to provide suitable mechanism whereby the screens or shutters may be readily operated, so that the dissolving effect may be made slowly or rapidly at the will of the operator and the opening in the screen or shutter be kept central with the optical axis of the condensing-lenses. I attain these objects by means of the mechanism shown in the accompanying drawings, in which—

Figure 1 is a perspective view of the lantern. Fig. 2 is a sectional view from above, showing the arrangement of the lenses and reflectors; and Fig. 3 is a view of the lamp with the outer case removed, showing the dissolving shutters or screens and the mechanism for operating them.

Similar figures refer to similar parts in all the views.

The condensing-lenses each consist of two plano-convex lenses 1 and 2, fixed at an angle of ninety degrees to each other and having a plane-mirror 3 between them, which is placed at an angle of forty-five degrees with the axes of the lenses, as shown in Fig. 2. One of these condensing-lenses and reflector combined is placed on each side of the lantern-body 4 at equal distances from the source of light 5, which may be a lamp, lime-cylinder, or electric light. Slide-holders 6, of any desired pattern, are placed directly in front of the front condensing-lens of each set and at the proper distance from the slide-holder. The objective lenses 7 are supported in any desired manner.

In order that the views thrown on the screen by either set of lenses may be made to register or occupy the same place, one or both sets of lenses with the slide-holders are not attached rigidly to the lantern-body 4, but to independent lens-holders 8, which are hinged or pivoted to the lantern-body at 9, which allows of the lenses being adjusted so that the optical center of each set will coincide on the screen. The adjustment is made by a thumb-nut 10 or some similar device.

The dissolving effect may be produced with my lantern by means of suitable shutters or slides operated in front of the objective lenses, if desired; but I prefer to use the dissolving screen or shutter shown in perspective in Fig. 3. The light 5 is partially surrounded by two sectors 12 and 13, which are secured, respectively, to two concentric sleeves 14 and 15. The sleeve 14 revolves freely in a suitable circular channel in the base of the lantern, while the sleeve 15 revolves around the sleeve 14, being supported by the flange 17. The two sectors 12 and 13 only partially inclose the light 5, so that when they are entirely closed on one side they will be open far enough on the opposite side to allow of the condensing-lens being entirely illuminated, as clearly shown in the sectional view, Fig. 2, where the light is entirely shut off from the lens 1ª and illuminates the entire surface of the lens 1. Upon revolving the sleeves 14 and 15 and their attached sectors 12 and 13 in opposite directions the opening toward the lens 1 will be closed, gradually shutting off the light from that lens, while the opening toward the lens 1ª will be opened as the other is closed. Thus by revolving the sleeves 14 and 15 and attached sectors 12 and 13 alternately in opposite directions the light may be directed through either set of lenses at will. The edges of the sectors 12 and 13 are notched or serrated, in order that the light may be more evenly distributed over the surface of the condensing-lenses while being shut off, as the dissolving effect is thus made more perfect. The concave surfaces of the sectors 12 and 13 are highly polished, thus serving when closed as a reflector to increase the illumination of the opposite lens.

The revolution of the sleeves 14 and 15 and attached sectors may be effected by any suitable mechanism; but I prefer to use that shown in Fig. 3, as the revolution of the sectors may be made uniform and regular, and the opening between them while they are being revolved will remain exactly central with the optical axis of the condensing-lenses. The bevel-toothed sectors 22 and 23 are attached to the sleeves 14 and 15, and a small bevel-wheel 24 revolves between the sectors, its teeth engaging with the teeth of both sectors. The bevel-wheel 24 is secured to the end of a short shaft 26, which revolves in a bearing 28, secured to the bed of the lantern. A milled wheel 27 is attached to the outer end of the shaft 26, which projects outside the lantern-case, thus allowing the operator to admit the light to either set of lenses at will without opening the lantern-case.

The manner of operating the lantern is the same as the ordinary dissolving lanterns, the slides being placed alternately in the two slide-holders 6 and 6ª and each view dissolved into the succeeding one by revolving the milled wheel 27, which, as heretofore explained, directs the rays from the single source of light alternately through each set of lenses.

Having thus described my invention, what I claim as new, and desire to secure by Letters Patent, is—

1. In a dissolving magic lantern, the combination, with the lantern-case 4 for inclosing the source of light, of the hinged or pivoted lens-holders 8 and 8ª, secured to said lantern-case on opposite sides of and at equal distances from the source of light, substantially as and for the purpose specified.

2. In a dissolving magic lantern, the combination, with the lantern-case 4, of the hinged or pivoted lens-holders 8 and 8ª and adjusting-screws 10, substantially as and for the purpose specified.

3. In a dissolving magic lantern having a single source of light and two sets of condensing and objective lenses, the dissolving screen or shutter consisting of two revolving sectors 12 and 13, having their edges notched or serrated and with their concave surfaces polished, substantially as and for the purpose specified.

4. In a dissolving magic lantern having a single source of light and two sets of condensing and objective lenses, the dissolving screen or shutter composed of two sectors 12 and 13, attached to the revolving sleeves 14 and 15, arranged and operating substantially as and for the purpose specified.

5. In a dissolving screen or shutter for a magic lantern having two sets of lenses with a single source of light, the combination, with the sectors 12 and 13 and sleeves 14 and 15, of the bevel-toothed sectors 22 and 23, bevel-wheel 24, shaft 26, and milled wheel 27, arranged and operating substantially as and for the purpose specified.

FRANK McCLINTOCK.

Witnesses:
EDWIN SHAW,
FRED. W. HALBOUER.